Jan. 5, 1943.    O. M. WHITTEN    2,307,652
BRAKE CONSTRUCTION
Filed Aug. 15, 1941    2 Sheets-Sheet 1

INVENTOR.
OWEN M. WHITTEN
BY Whittemore Hulbert Belknap,
ATTORNEYS

Jan. 5, 1943.     O. M. WHITTEN     2,307,652
BRAKE CONSTRUCTION
Filed Aug. 15, 1941     2 Sheets-Sheet 2
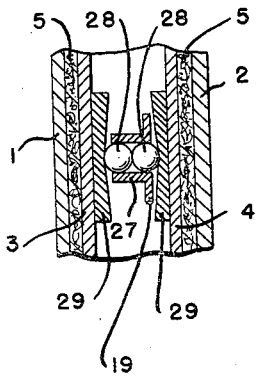
FIG. 3.
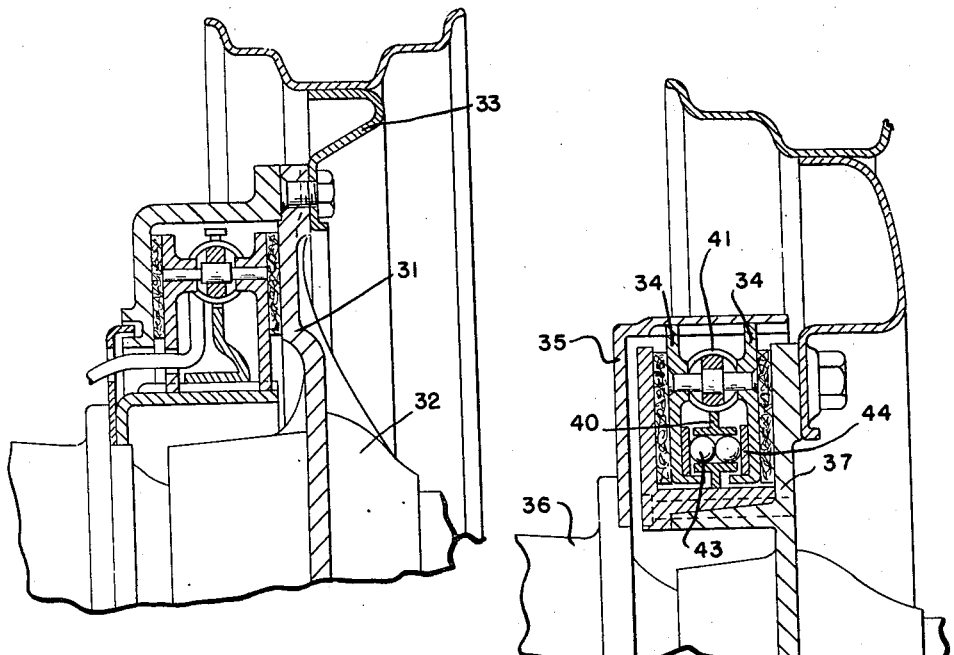
FIG. 4.
FIG. 5.
INVENTOR.
OWEN M. WHITTEN
BY
ATTORNEYS Patented Jan. 5, 1943

2,307,652

UNITED STATES PATENT OFFICE 2,307,652

BRAKE CONSTRUCTION

Owen M. Whitten, Detroit, Mich., assignor to Kelsey-Hayes Wheel Company, Detroit, Mich., a corporation of Delaware Application August 15, 1941, Serial No. 407,058

5 Claims. (Cl. 188—72)

The invention relates to brake constructions and refers more particularly to brake constructions for wheels.

The invention has for one object to provide an improved construction of brake which is powerful in operation.

The invention has for other objects to provide an improved means for applying the brake; and to so construct the brake that its parts are effectively protected from dirt, moisture, and the like.

Figure 2:
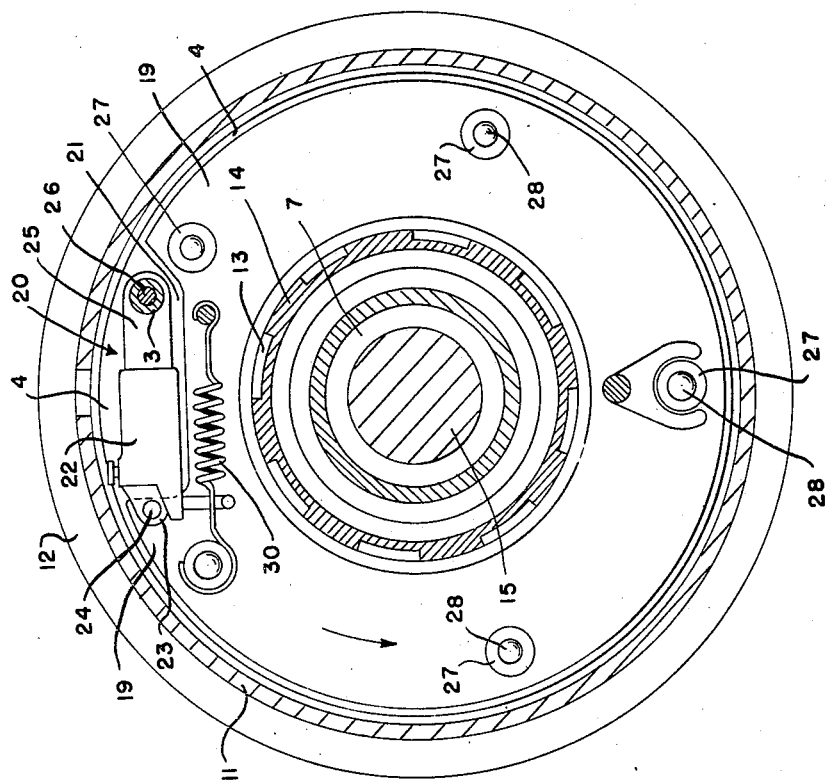
Figure 1:
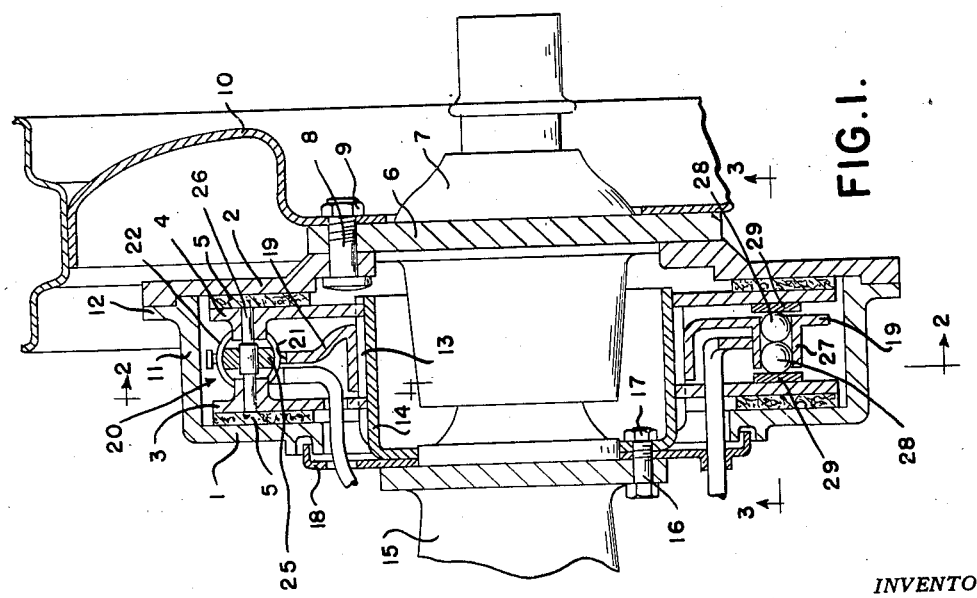

These and other objects of the invention will become apparent from the following description, taken in connection with the accompanying drawings, in which Figure 1 is a central section through a brake construction embodying the invention and applied to a vehicle wheel;

Figures 2 and 3 are cross sections on the lines 2—2 and 3—3, respectively, of Figure 1;

Figures 4 and 5 are views similar to Figure 1, showing other embodiments.

Referring to Figures 1, 2 and 3, the brake construction comprises the rotatable inboard and outboard brake elements 1 and 2, respectively, and the non-rotatable inboard and outboard brake elements 3 and 4, respectively, which latter brake elements are movable axially away from each other into frictional engagement with the rotatable brake elements upon operation of the brake applying means. The rotatable brake elements are discs having axially spaced generally radially extending faces for frictional engagement by the linings 5 upon the non-rotatable brake elements, which are also generally radially extending discs. The rotatable outboard brake element 2 is secured to the fixed flange 6 of the wheel hub 7 by suitable means, such as the bolts 8 and the nuts 9, which are also used in securing the motor vehicle wheel 10 to the hub. The rotatable inboard brake element 1 has the annular flange 11 which encircles the non-rotatable brake elements and the brake applying means and which has at its free end the radial flange 12 which is fixedly secured to the rotatable outboard brake element by suitable means, such as bolts and nuts (not shown). The non-rotatable brake elements are positively held from rotation by being formed at their inner edges with projections axially slidably engaging the keyways 13 in the non-rotatable sleeve 14 which is fixedly secured to the axle housing 15 by suitable means, such as the bolts 16 and the nuts 17. For cooperating with the rotatable brake elements to effectively protect the non-rotatable brake elements and the brake applying means from dirt, moisture, and the like, there is the closure plate 18 fixedly secured to the axle housing 15, preferably by the bolts 16 and the nuts 17, and having a peripheral flange fitting in an annular groove formed in the rotatable inboard brake element at its inner edge.

The means for applying the brake comprises the actuating member 19 substantially coaxial with the rotatable and non-rotatable brake elements and the fluid pressure operated actuator 20.

The actuating member 19 is in the nature of a disc journaled on the sleeve 14 and extending generally radially between the non-rotatable brake elements 3 and 4, respectively. The actuating member is formed with the recess 21 in its outer edge for receiving the actuator 20 which preferably extends chordwise of the brake. The actuator 20 may be of any usual construction, there being several now on the market. As shown, its cylinder 22 is provided with the bifurcations 23 extending beyond its closed end and pivotally connected by the transverse pin 24 to the actuating member 19. The piston rod 25 is operatively connected to the non-rotatable brake elements 3 and 4 by the transverse pin 26 which extends through the piston rod and into bosses formed in the non-rotatable brake elements. The actuating member 19 is further provided with the transverse bored bosses 27 which are peripherally spaced at equal distances from each other and in which are located the pairs of balls 28. The balls of each pair are engageable with the opposed cams 29 formed upon the non-rotatable inboard and outboard brake elements. The arrangement is such that when braking fluid under pressure is forced to the actuator 20 it compels a relative angular movement or rotation of the actuating member 19 and non-rotatable brake elements by moving the actuating member peripherally around the non-rotatable sleeve 14. As a result, the balls of each pair which are in contact with each other and also in contact with the cams 29 compel the non-rotatable brake elements to move axially away from each other to bring their linings 5 into frictional engagement with the rotatable brake elements. Upon the fluid pressure being relieved, the parts are assisted in returning to their normal or off positions by suitable means, such as the coil spring 30 connected to the non-rotatable inboard brake element 3 and the actuating member 19.

The modification illustrated in Figure 4 is, in general, the same as that illustrated in Figures 1, 2 and 3, but differs essentially in forming the rotatable outboard brake element 31 as an integral part of the wheel hub 32 and mounting the wheel 33 upon the brake element at its outer edge.

Figure 5 discloses another modification in which the non-rotatable brake discs 34 are splined at their outer edges to the cup-shaped carrier member 35 which is fixedly secured to the axle housing 36. The rotatable outboard brake disc 37 is shown as forming a part of the wheel hub and the rotatable inboard brake disc is bolted at its inner edge to the hub. The brake applying means, including the actuating disc 40 and the fluid pressure operated actuator 41 and also the cams 44 and balls 43 are constructed and arranged in the same manner as the previously described modifications.

What I claim as my invention is:

1. In a brake, relatively rotatable brake elements comprising axially spaced brake members and brake members movable axially in opposite directions into engagement with said first mentioned brake members, a member between and substantially co-axial with said axially movable brake members and having a recess in its outer edge, fluid pressure operated means extending within the recess and operatively connected to said axially movable brake members and substantially co-axial member for relatively rotating the same, and cooperating means on said axially movable brake members and substantially co-axial member for axially moving said axially movable brake members toward said first mentioned brake members upon relative rotation of said axially movable brake members and substantially co-axial member.

2. In a brake, relatively rotatable brake elements comprising axially spaced brake members and axially movable brake discs between and engageable with said first mentioned brake members, an actuating disc between and substantially co-axial and co-extensive with said brake discs, a fluid pressure operated actuator within the confines of said brake elements and operatively connected to said brake discs and actuating disc at their outer edges for relatively rotating the same, and cooperating means on said brake discs and actuating disc for axially moving the former into engagement with said first mentioned brake members upon relative rotation of said brake discs and actuating disc.

3. In a brake, relatively rotatable brake elements comprising axially movable brake members, a substantially co-axial actuating member between said brake members, means connected directly to said brake members and actuating member at the outer edges thereof for relatively rotating said brake members and actuating member, cam means on said brake members, and cooperating ball means on said actuating member for axially moving said brake members upon relative rotation of said brake members and actuating member.

4. In a brake, rotatable axially spaced brake discs, non-rotatable axially spaced brake discs between and movable axially in opposite directions into engagement with said rotatable brake discs, an actuating disc between and substantially co-axial with said non-rotatable brake discs and having a recess in its radially outer portion, cooperating means on said non-rotatable brake discs and actuating disc arranged in an annular zone for axially moving said non-rotatable brake discs toward said rotatable brake discs upon rotation of said actuating disc, and an actuator extending within the recess in said actuating disc and operatively connected to said non-rotatable brake discs and actuating disc in substantially the annular zone of said cooperating means for rotating said actuating disc.

5. In a brake, relatively rotatable brake elements comprising axially spaced brake members and axially movable brake members between and engageable with said first mentioned brake members, an actuating member between said second mentioned brake members, an actuator connected to said second mentioned brake members and actuating member for relatively rotating said second mentioned brake members and actuating member, cam means on said second mentioned brake members, and cooperating ball means on said actuating member for axially moving said second mentioned brake members upon relative rotation of said second mentioned brake members and actuating member, said ball means comprising a pair of balls engaging each other and said cam means.

OWEN M. WHITTEN.